(12) United States Patent
Leman et al.

(10) Patent No.: US 10,461,673 B2
(45) Date of Patent: Oct. 29, 2019

(54) SINGLE PHASE MOTOR DRIVE CIRCUIT AND A METHOD OF DRIVING A SINGLE PHASE MOTOR

(71) Applicant: Melexis Bulgaria Ltd., Sofia (BG)

(72) Inventors: Dirk Leman, Lier (BE); Petko Nedelev, Sofia (BG)

(73) Assignee: Melexis Bulgaria Ltd., Sofia (BG)

( * ) Notice: Subject to any disclaimer, the term of this patent is extended or adjusted under 35 U.S.C. 154(b) by 0 days.

(21) Appl. No.: 15/674,683

(22) Filed: Aug. 11, 2017

(65) Prior Publication Data

US 2018/0048251 A1 Feb. 15, 2018

(30) Foreign Application Priority Data

Aug. 11, 2016 (EP) ..................... 16183727

(51) Int. Cl.
- *H02P 6/26* (2016.01)
- *H02P 6/28* (2016.01)
- *H02P 25/18* (2006.01)
- *H02P 6/14* (2016.01)
- *H02P 6/17* (2016.01)
- *H02P 6/08* (2016.01)
- *H02P 25/04* (2006.01)

(52) U.S. Cl.
CPC ............... *H02P 6/26* (2016.02); *H02P 6/08* (2013.01); *H02P 6/17* (2016.02); *H02P 25/04* (2013.01)

(58) Field of Classification Search
CPC .... H02P 6/14; H02P 25/18; H02P 6/28; H02P 6/26
USPC .................... 318/139, 244, 400.04
See application file for complete search history.

(56) References Cited

U.S. PATENT DOCUMENTS

| | | | | |
|---|---|---|---|---|
| 5,694,015 | A | * 12/1997 | Luniewicz | G05B 5/01 318/608 |
| 9,013,123 | B2 | * 4/2015 | Innes | H02P 3/12 318/63 |
| 2009/0039807 | A1 | * 2/2009 | Yabusaki | H02P 25/18 318/244 |

(Continued)

FOREIGN PATENT DOCUMENTS

EP 2045908 A2 4/2009

OTHER PUBLICATIONS

European Search Report from EP Application No. 16183727.3, dated Jan. 25, 2017.

*Primary Examiner* — Bickey Dhakal
*Assistant Examiner* — Cortez M Cook
(74) *Attorney, Agent, or Firm* — Workman Nydegger

(57) ABSTRACT

A single phase motor drive circuit for driving a single phase motor, comprising: a timer unit for receiving a sensor signal indicative of an angular position of a rotor, and for providing a timing signal in phase with the sensor signal; a waveform generator for generating an waveform for energizing the motor, the waveform generator being adapted for receiving the timing signal and at least one configurable setting (Soff), and for generating the waveform based thereon; a configuration unit adapted for receiving a first input signal indicative of a desired motor speed and a second input signal (Vbat) indicative of the supply voltage, and for determining the configurable setting based on the input signals, and for providing the setting to the waveform generator to dynamically configure the waveform generator. A method of driving a single phase motor.

13 Claims, 7 Drawing Sheets

(56) References Cited

U.S. PATENT DOCUMENTS

| | | | |
|---|---|---|---|
| 2012/0217907 A1* | 8/2012 | Sakaguchi | H02P 6/26 318/400.1 |
| 2014/0062355 A1* | 3/2014 | Wang | H02P 6/14 318/400.04 |
| 2014/0210379 A1* | 7/2014 | Kato | H02P 6/153 318/139 |
| 2015/0303840 A1 | 10/2015 | Brannen | |

* cited by examiner

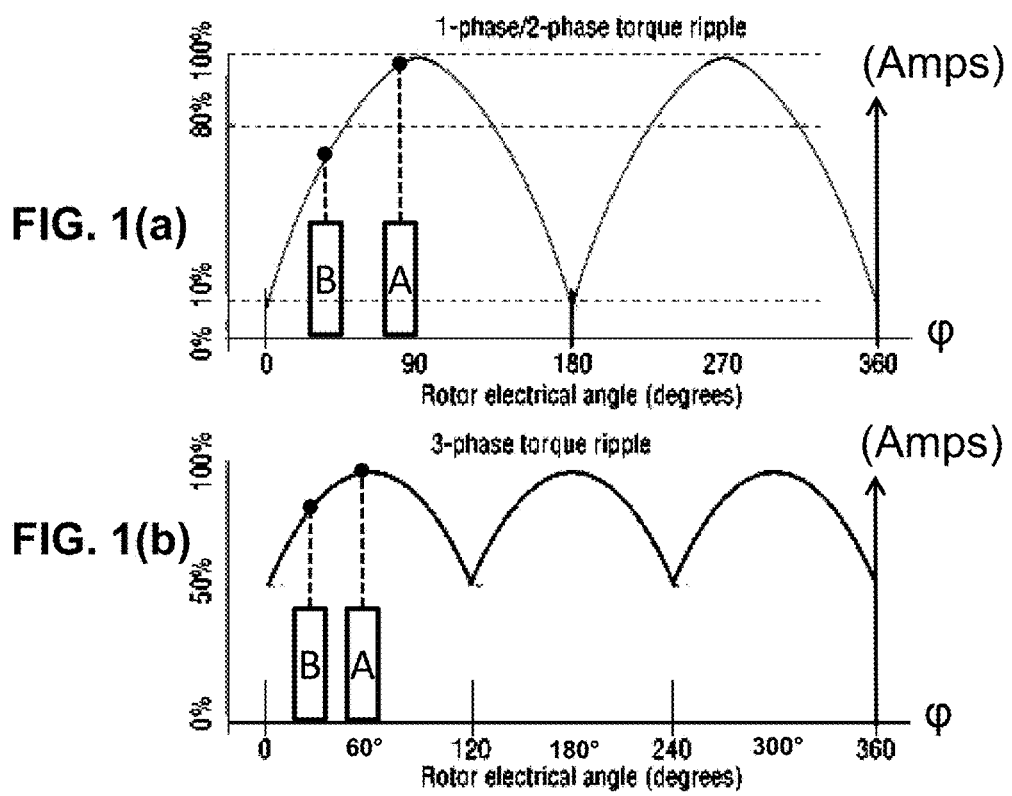
(prior art)
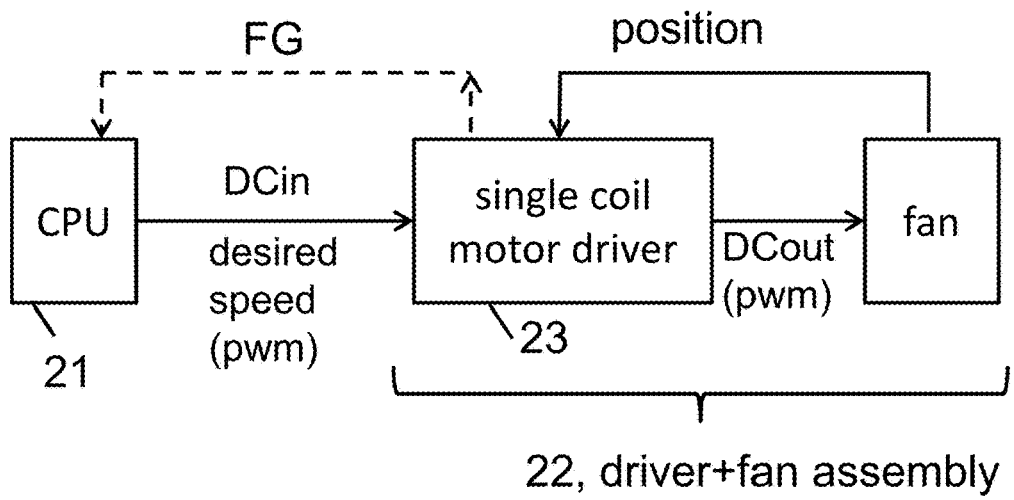
FIG 2 (prior art)

Vmin = 11V
Vmax = 16V
max_ON = 160°

Nsteps = 32
Tslot = 5.6°

| desired speed | Vbat | ON time | OFF time | OFF_begin | OFF_end |
|---|---|---|---|---|---|
| [%] | [V] | [°] | [°] | [°] | [°] |
| Vrel=100% | 11 | 160 | 20 | 10 | 10 |
| Vrel=100% | 11,5 | 153 | 27 | 13 | 13 |
| Vrel=100% | 12 | 147 | 33 | 17 | 17 |
| Vrel=100% | 12,5 | 141 | 39 | 20 | 20 |
| Vrel=100% | 13 | 135 | 45 | 22 | 22 |
| Vrel=100% | 13,5 | 130 | 50 | 25 | 25 |
| Vrel=100% | 14 | 126 | 54 | 27 | 27 |
| Vrel=100% | 14,5 | 121 | 59 | 29 | 29 |
| Vrel=100% | 15 | 117 | 63 | 31 | 31 |
| Vrel=100% | 15,5 | 114 | 66 | 33 | 33 |
| Vrel=100% | 16 | 110 | 70 | 35 | 35 |

110° = 160°×11V/16V

| Noff | Noff_begin | Noff_end |
|---|---|---|
| [#] | [#] | [#] |
| 4 | 2 | 2 |
| 5 | 2 | 3 |
| 6 | 3 | 3 |
| 7 | 3 | 4 |
| 8 | 4 | 4 |
| 9 | 4 | 5 |
| 10 | 5 | 5 |
| 10 | 5 | 5 |
| 11 | 5 | 6 |
| 12 | 6 | 6 |
| 12 | 6 | 6 |

| ON time | Ton x Vbat | dev |
|---|---|---|
| [°] |  | [%] |
| 157,50 | 1732,5 | -1,6 |
| 151,88 | 1746,6 | -0,8 |
| 146,25 | 1755,0 | -0,3 |
| 140,63 | 1757,8 | -0,1 |
| 135,00 | 1755,0 | -0,3 |
| 129,38 | 1746,6 | -0,8 |
| 123,75 | 1732,5 | -1,6 |
| 123,75 | 1794,4 | 2,0 |
| 118,13 | 1771,9 | 0,7 |
| 112,50 | 1743,8 | -0,9 |
| 112,50 | 1800,0 | 2,3 | ideal: 160×11=1760

FIG 8

| desired speed | Vbat | ON time | OFF time | OFF_begin | OFF_end |
|---|---|---|---|---|---|
| [%] | [V] | [°] | [°] | [°] | [°] |
| Vrel=35% | 11 | 56 | 124 | 62 | 62 |
| Vrel=35% | 11,5 | 54 | 126 | 63 | 63 |
| Vrel=35% | 12 | 51 | 129 | 64 | 64 |
| Vrel=35% | 12,5 | 49 | 131 | 65 | 65 |
| Vrel=35% | 13 | 47 | 133 | 66 | 66 |
| Vrel=35% | 13,5 | 46 | 134 | 67 | 67 |
| Vrel=35% | 14 | 44 | 136 | 68 | 68 |
| Vrel=35% | 14,5 | 42 | 138 | 69 | 69 |
| Vrel=35% | 15 | 41 | 139 | 69 | 69 |
| Vrel=35% | 15,5 | 40 | 140 | 70 | 70 |
| Vrel=35% | 16 | 39 | 142 | 71 | 71 |

56 = 160 x 35%

| Noff | Noff_begin | Noff_end |
|---|---|---|
| [#] | [#] | [#] |
| 22 | 11 | 11 |
| 22 | 11 | 11 |
| 23 | 11 | 12 |
| 23 | 11 | 12 |
| 24 | 12 | 12 |
| 24 | 12 | 12 |
| 24 | 12 | 12 |
| 24 | 12 | 12 |
| 25 | 12 | 13 |
| 25 | 12 | 13 |
| 25 | 12 | 13 |

| ON time | Ton x Vbat | dev |
|---|---|---|
| [°] |  | [%] |
| 56,25 | 618,8 | 0,4 |
| 56,25 | 646,9 | 5,0 |
| 50,63 | 607,5 | -1,4 |
| 50,63 | 632,8 | 2,7 |
| 45,00 | 585,0 | -5,0 |
| 45,00 | 607,5 | -1,4 |
| 45,00 | 630,0 | 2,3 |
| 45,00 | 652,5 | 5,9 |
| 39,38 | 590,6 | -4,1 |
| 39,38 | 610,3 | -0,9 |
| 39,38 | 630,0 | 2,3 | ideal: 56×11=616

SINGLE PHASE MOTOR DRIVE CIRCUIT AND A METHOD OF DRIVING A SINGLE PHASE MOTOR

FIELD OF THE INVENTION

The present invention relates to the field of single phase (also referred to as single coil) motor drive circuits and to systems comprising such a circuit, and methods of driving such a motor.

BACKGROUND OF THE INVENTION

The present invention relates to single phase brushless DC motors, i.e. a motor with a single coil. Single-phase motors are typically used in low cost motor applications, such as fan cooling applications, which come in two flavors: (a) without speed control, and (b) with speed control. In case (a) the fan is simply switched ON or OFF. In case (b) there is typically a remote CPU involved which provides a signal indicative of the desired speed, typically in the form of a PWM signal, while the motor driver itself basically converts the input PWM signal into an output PWM signal according to some look-up table or transfer function.

For many applications, three phase brushless DC motors are preferred because of their lower torque ripple, leading to lower noise, higher efficiencies and higher start up torque. But single coil motors are cheaper to produce and to drive, and therefore preferred in some high-volume markets, such as e.g. fans for cooling CPU's in desktops, refrigerators, printers, or fans in automotive applications, as a few examples only.

Brushless DC motors have the advantage that no brushes are needed, but they require a specific driving scheme, called "electrical commutation" to change the direction of the current through the one or more coils, which principle is well known in the art.

A specific market requirement of speed control fans is the definition of the speed curve. This speed curve defines how an input signal, for instance a duty cycle input signal (DCin) is converted into a resulting fan motor speed. In case of fan-drivers which control power stages using PWM to control the coil current, the coil energization is the result of a waveform generated. As is known in the art, PWM control offers many advantages, inter alia: low CPU load, possibility to generate or approximate virtually any waveform (e.g. sinusoidal waveform), it allows that transistors of the drive stage (e.g. containing dual H-bridges) are driven either in their ON state or in their OFF state (but not in their "linear region") thereby reducing heat dissipation. Preferably a relatively high switching frequency is used, for example at least 16 kHz or at least 20 kHz to avoid acoustical noise caused by switching currents. The higher the PWM frequency, the better a target waveform can be approximated, typically resulting in lower torque ripple.

A well known problem caused by the switching of motor currents having a magnitude in the order of a few hundred mAmp or more, is that these currents may cause EMC related issues (due to conducted emissions and radiated emissions), which problems are typically addressed using addition of appropriate filters, such as for example pi-filters, containing at least one coil and at least two capacitors.

Another way of driving a motor at a variable speed is by driving the power transistors of the drive stage in their linear region, e.g. by slowly turning them "ON" and "OFF". This also offers the advantage of approximating a target waveform very accurately, but has the disadvantage that it dissipates more power in the transistors, which reduces the power efficiency, and requires active or passive cooling.

The present invention is related to fans in applications which are sensitive to electromagnetic coupled (EMC) noise, for instance in an automotive environment, which is a high-volume and highly competitive market, where cost is sometimes more important than secondary aspects, such as acoustical noise.

FIG. 2 shows a typical system configuration where a remote processor 21 provides a duty cycle signal (DCin) as a PWM input-signal to the single coil motor driver. Typically the remote processor modifies this PWM input signal based on the speed feedback it receives from the single coil motor driver, typically in the form of a Frequency signal (referred to as FG signal). The single coil motor driver should provide a monotonous relationship between the PWM input and the speed of the fan. This relationship can be a rising speed for a rising PWM input duty cycle, or the relationship can be inverse, where a rising speed implies a reducing speed. Even though such monotonous relationship is not absolutely mandatory, it allows a remote processor to easily close the speed control loop.

FIG. 3 shows a characteristic of such a prior art low cost fan-driver, designed for providing a PWM signal with an output duty cycle (DCout) signal in order to modify the applied drive current. The speed resulting from the energization depends on the fan design, such as the blade design, and system environment, such as back pressure, applied supply voltage, and the present ambient temperature. The lack of closed loop speed control, and the non-linear increase of the load as a function of the speed, causes that the speed curve is a non-linear function of the output duty cycle (DCout), but several applications accept a natural speed curve in which the percentage value of duty-cycle-in (DCin) is equal to that of DCout. This relationship is quite easy to realize in a state-machine and results in very low-cost speed controlled fan-drivers.

In systems like FIG. 2 the remote processor can regulate the fan speed such as to compensate for environmental change, or fan tolerances, based on the FG signal feedback, and the natural speed curve of the low cost fan driver.

SUMMARY OF THE INVENTION

It is an object of embodiments of the present invention to provide a method and a device for driving a single coil motor in a manner suitable for an environment which is sensitive to EMC, such as automotive applications.

It is a particular object of embodiments of the present invention to provide a method and a device for driving a single coil motor at a desired speed, which is capable of driving the fan in a manner which is substantially insensitive to variations of the supply voltage.

It is a particular object of embodiments of the present invention to provide such a method and a device preferably without increasing acoustical noise and/or without increasing system cost and/or without increasing heat dissipation, and preferably at least two of these, and more preferable all of these.

It is a specific object of embodiments of the present invention to provide such a method and a device having a reduced sensitivity to supply voltage variations and/or temperature variations in an automotive environment, without requiring EMC filter components.

It is an object of particular embodiments of the present invention to provide a relatively simple fan driver with an open-loop control or a closed-loop control, in particular to provide a fan-driver which does not contain a programmable processor.

These objectives are accomplished by a method and device according to embodiments of the present invention.

In a first aspect, the present invention provides a single phase motor drive circuit for driving a single phase motor, the single phase motor drive circuit comprising: a timer unit adapted for receiving a signal indicative of an angular position of a rotor of the single phase motor, and for providing at least one timing signal in phase with the sensor signal; a waveform generator for generating at least one waveform for energizing the single phase motor, the waveform generator being adapted for receiving the at least one timing signal and for receiving at least one configurable setting, and being adapted for generating the at least one waveform based on the at least one timing signal and based on the at least one configurable setting, the at least one configurable setting consisting of one or more ON-time settings or OFF-time settings; a configuration unit adapted for receiving a first input signal indicative of a desired speed of the single phase motor and for receiving at least one of a second input signal indicative of a supply voltage and a third input signal indicative of a temperature, the configuration unit being adapted for providing the at least one configurable setting as a function of the first input signal and at least one of the second input signal and the third input signal to the waveform generator to dynamically configure the waveform generator as a function of the desired speed and at least one of the supply voltage and the temperature.

Thus, there are three possibilities on which the configurable setting can be based: (i) the configurable setting is based on desired speed and supply voltage and temperature, (ii) the configurable setting is based on desired speed and supply voltage, (iii) the configurable setting is based on desired speed and temperature.

The time unit may be adapted for receiving a signal such as for example a sensor signal from an internal detection unit, or a signal from an internal software module, or a sensor signal from an external sensor device, etc.

It is an advantage of using only ON-time settings and OFF-time settings (but no slope or soft-switching or sinusoidal shape for example), because such a waveform is extremely easy to generate, thus simplifying the implementation.

It is an advantage that the single phase motor drive circuit can be implemented as an analog circuit or as a digital circuit, or a mixed analog and digital circuit.

It is an advantage that the single phase motor drive circuit can be implemented with simple logic, (e.g. with a state machine using counters and an oscillator), and that no programmable processor is required.

It is an advantage of a waveform having only ON and OFF values, or having logical "−1", "0" and "+1" values when taking into account that the single phase coil can be powered in two opposite directions, that such a waveform signal can be readily applied to the single-coil motor by simply opening and closing switches as indicated by the waveform.

It is an advantage of the present invention that the shape of the waveform is deliberately adjusted on the fly, as a function of the input signals, in contrast to prior art motor drivers, where such parameters are fixed.

It is an advantage of dynamically configuring the waveform as a function of a desired speed and of a supply voltage or temperature because it allows better approximating the desired speed irrespective of variations of the supply voltage and/or the temperature. In this way acoustic noise can be reduced (related to inadvertent acceleration and deceleration of the motor due to voltage variations, even when the desired relative speed is fixed).

The single phase motor driver circuit may be comprised in an integrated semiconductor device.

It is an advantage that the single phase motor driver circuit is capable of driving motors with different maximum motor speed, for example any motor speed in the range of thousand (1000) RPM to ten thousand (10000) RPM, for example about 2000 RPM, or about 4000 RPM, or about 6000 RPM, or about 8000 RPM, or about 10000 RPM.

The first signal can be dynamic input signal (e.g. a PWM signal having a variable duty cycle) or can be a static signal, e.g. defined by blown fuses or by non-volatile memory-settings or by external components (e.g. pull-up or pull-down resistors connected to configuration pins). The first signal can be converted into a first digital value in any known manner.

The second signal is typically an analog voltage signal, e.g. derived from a battery voltage by means of a simple voltage divider. The second signal can be converted into a second digital value in known manners, e.g. using an analog-to-digital convertor (ADC).

In an embodiment the motor drive circuit is adapted for applying the waveform to the single phase motor as a baseband signal.

It is an advantage of applying the waveform as a baseband signal (in contrast to e.g. an additional PWM modulation at a frequency above 16 kHz), that an EMC filter, for example in the form of a pi-filter, can be omitted. Applying the waveform as a baseband signal can be performed by simply opening and closing switches of a drive stage in direct correspondence with the value of the waveform.

In an embodiment the waveform generator is adapted for generating a waveform: having a zero amplitude during a first portion of a phase, the first portion having a first duration defined by or derivable from the at least one configurable setting; and having a maximum amplitude during a second portion of the phase, the second portion having a second duration defined by or derivable from the at least one configurable setting; and having a zero amplitude during a third portion of a phase of the phase, the third portion having a third duration defined by or derivable from the at least one configurable setting.

During the first duration the waveform is logical zero, which means in practice that a power stage typically following the waveform generator will not provide power to the motor during this first fraction of the phase. In a preferred embodiment, this can for example be accomplished by opening the power switches of an H bridge.

During the second duration the waveform is logical one, which means in practice that a power stage typically following the waveform generator will provide full power to the motor during this second fraction of the phase. In a preferred embodiment, this is accomplished by closing the power switches of an H bridge, so that the power supply voltage is applied over the motor coil in a first direction.

During the third duration the waveform is logical zero, which means in practice that a power stage typically following the waveform generator will not provide power to the motor during this third fraction of the phase. In a preferred embodiment, this is accomplished by opening the power switches of an H bridge.

Preferably, both the first and third duration are non-zero, so that no power is provided to the motor at the moment of commutation, which allows the current in the coil to decrease to almost zero, before the coil is powered in the opposite direction in the next phase. This prevents that active breaking is applied, and thus reduces acoustical noise.

In an embodiment the waveform generator is further adapted for generating the waveform to optionally also have a zero amplitude during a fourth portion of the phase, the fourth portion having a fourth duration defined by or derivable from the at least one configurable setting, and falling within the second duration of the phase.

Stated in simple terms, this embodiment allows providing one extra dip of a configurable position and duration, somewhere inside the "second duration" or ON-time of FIG. 6(a). The position of the "extra dip" can for example be provided relative to the start of the phase, or relative to the start of the second duration. The width of the extra dip can for example be provided relative to the start of the phase, or relative to the start of the second duration.

This effectively means that the waveform only has one single rectangular pulse (see FIG. 6a) or at most two rectangular pulses in each 180° phase of the timing signal (thus not a very large amount of rectangles as is the case with classical PWM control at a frequency of at least 16 or 20 kHz). The signal of the present invention is a baseband signal having adjustable parameters, and having a relatively low ground frequency (e.g. in the order of 166 Hz in case of 5000 RPM). This is fundamentally different from what is known as a "PWM" waveform, where pulses at a frequency higher than 20 kHz are used so as to be inaudible for human beings).

It is an advantage of using only one single pulse or only two single pulses per phase period because it provides the following advantages:
(1) no PWM hardware block is needed;
(2) there is plenty of time to calculate the settings for the next phase, hence only relatively low-speed components are required;
(3) since the waveform only has a low ground frequency (e.g. in the order of 100 to 200 Hz), the acoustic noise generated is small (humans are mainly sensitive in the frequency range from about 300 to about 3300 Hz), which range is largely avoided;
(4) because of this low frequency, the need for an expensive EMC filter (e.g. pi-filter), as is required in case of PWM-control at for example 20 kHz, can be omitted, thus reducing component cost. Even though the absolute cost of a pi-filter may seem small, it has an important impact on the total cost of low fan drive circuits in a competitive market place,
(5) by using rectangular pulse (having steep edges, in contrast to a sloping rising or falling edge), transistors can be used as switches in their ON or OFF state, and not in their linear mode. This is more power efficient, and avoids heat production, hence also avoids the requirement for active or passive cooling means.

It is a major advantage of providing the ability to add an additional dip somewhere in the region from about 25% to about 75% of the phase period, because, if torque is taken into account, the effect of making the first duration one clock pulse longer or shorter is relative small, whereas a dip of even one clock pulse near the middle of the phase has a much higher impact.

Although in particular embodiments the dip can always be located near the middle of the phase period, a finer granularity of the torque, and thus of the motor speed, can be achieved by allowing the extra dip to be located outside of the middle.

In an embodiment the configuration unit is either adapted for providing the at least one configurable setting as a function of the first input signal and at least one of the second input signal and the third input signal but independent of the actual speed of the motor; or the configuration unit is adapted for providing the at least one configurable setting as a function of the first input signal and at least one of the second input signal and the third input signal and as a function of the actual speed of the motor.

This means that the driver circuit can be implemented as an open-loop or a closed-loop system.

It is an advantage of an open-loop implementation, (i.e. wherein the single phase motor drive circuit does not take the actual motor speed into account) that it configures the at least one configurable parameter solely based on the first and second, or first and third, or first and second and third incoming signal, which may be an analog signal or a digital input signal, (e.g. a PWM signal), making it compatible with legacy fan drivers in the market. An open-loop is easier to implement, and requires less silicon, which is extremely important in high-volume markets.

It is an advantage of a closed-loop implementation that it can approximate the desired speed better, by not only compensating to variations of the supply voltage and/or temperature, but for example also to varying load conditions.

In an embodiment the timer unit comprises at least one counter.

The timer unit can be implemented in an analog way, e.g. based on charging and discharging capacitors, or in a digital way.

It is an advantage of using a digital implementation, in particular using at least one counter, because it is less sensitive to production variations and operation variations (like supply voltage and temperature changes), and allows more accurate arithmetic and (if desired) more complex calculations.

In an embodiment the single phase motor drive circuit further comprises an oscillator for generating a clock signal to the timer unit.

When using one or more counters, a clock signal is needed. The clock signal may be applied from outside, or may be generated inside the integrated driver chip.

It is an advantage that the clock signal can be implemented by means of a simple oscillator, for example an RC-oscillator. This is possible because the absolute time is not required, but only a relative time. In particular, the off-time setting can be expressed as a percentage or a fraction of the total phase time. Such oscillator can be easily embedded in the semiconductor device. In this way at least one package-pin and external circuitry can be saved.

In an embodiment the single phase motor drive circuit further comprises a digitizer, wherein the digitizer is adapted for digitizing the first input signal or a derivative thereof in order to obtain a first digital value indicative of the desired speed; and wherein the digitizer is adapted for digitizing the second input signal or a derivative thereof in order to obtain a second digital value indicative of the supply voltage and/or wherein the digitizer is adapted for digitizing the third input signal or a derivative thereof in order to obtain a third digital value indicative of a temperature; and wherein the configuration unit is adapted for determining the at least one configurable setting as a function of the first digital value and at least one of the second digital value and third digital value Optionally a quantizer can also be added, for example to limit the number of bits of the digitized value. The quantizer may truncate or perform a rounding function.

The configuration unit may comprise for example a two or three-dimensional look-up table, where the first and second, or first and third, or first and second and third digital value are used as index, the look-up table holding the at least one configurable setting.

In an embodiment the single phase motor drive circuit further comprises an arithmetic unit, wherein the configurable setting is calculated as a function of the first digital value and the second digital value.

In such a case the drive circuit would further comprise a calculation unit, e.g. an ALU.

In this embodiment the drive circuit may calculate the at least one configurable setting on-the-fly, or obtain approximate values from a look-up table or memory, and interpolate the approximate values.

Preferably the or at least one of the at least one configurable settings is inversely proportional to the second digital value Vbat.

In an embodiment the sensor comprises a Hall element.

Although other ways of determining the angular rotor position may be used (for example an optical sensor connected to the motor axis and an optical decoder), it is an advantage of a Hall element that it is a contactless position sensor, capable of sensing a magnetic field associated with the rotor, thus being robust against wear and dust. The Hall sensor can be external or internal of the single phase motor driver circuit. When embedded or integrated in the same chip as the single phase motor driver circuit, typically three pins can be saved, thus resulting in a smaller package, and thus reducing the cost.

In an embodiment the single phase motor drive circuit further comprises a drive unit adapted for receiving the at least one waveform from the waveform generator and for applying the supply voltage to the single phase motor in accordance with the waveform.

The drive circuit may comprise a dual H-bridge, comprising two legs, each leg comprising two transistors in series connected between a supply node and a ground node, the transistors being used as switches in an "ON" or "OFF" mode.

It is an advantage to embed the drive unit in the motor drive circuit, because in that way external components can be avoided, thus reducing board space, component count and overall cost.

In an embodiment a) the single phase motor drive circuit is embedded in a packaging having at most eight pins; or b) the single phase motor drive circuit further comprises a Hall sensor and the drive unit, and is embedded in a packaging having only six pins.

It is an advantage of a single phase motor drive circuit embedded in a packaging having eight pins or less, because for this kind of devices the package cost is a considerable part of the total cost, hence by reducing the number of pins, the total cost can be reduced. This is possible by integrating for example the sensor and/or the clock generator and/or the drive circuit, and preferably all of them.

It is a major advantage of an embodiment where the single phase motor drive circuit is embedded in a package having only six pins that it allows the price of the solution to be reduced even more, while at the same time increasing functionality (as compared to prior art solutions not providing speed control) and reducing acoustic noise (by taking into account and compensating for supply voltage variations).

In a second aspect the present invention also provides an assembly comprising: a single phase motor driver according to the first aspect; a fan comprising a single-coil motor, an output of the single phase motor driver being connected to an input of the motor for providing power.

In a third aspect the present invention also provides a method of driving a single phase motor, comprising the steps of: receiving a sensor signal indicative of an angular position of a rotor of the single phase motor; generating at least one timing signal in phase with the sensor signal, and providing said at least one timing signal to a waveform generator; receiving or retrieving a first input signal indicative of a desired speed of the single phase motor; receiving a second input signal indicative of a supply voltage; determining at least one configurable setting as a function of the first and second input signal, and providing the at least one configurable setting to the waveform generator; generating at least one waveform based on the at least one timing signal and based on the at least one configurable setting.

The method may further comprise a step of providing output signals for energizing the single phase motor in a manner corresponding to the generated waveform It is an advantage that by this method at least one setting of the generated waveforms is dynamically adjusted as a function of the input signal.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1($a$) shows a typical torque of a single-coil motor.

FIG. 1($b$) shows a typical torque of a three-phase motor, as a function of angular rotor position.

FIG. 2 shows a fan cooling system known in the art, comprising a processor, and a driver and fan assembly, the assembly comprising a single coil motor driver and a single coil fan motor.

FIG. 8 and FIG. 9 show exemplary numerical data to illustrate one example of how the configurable settings may be determined.

Figure 3:
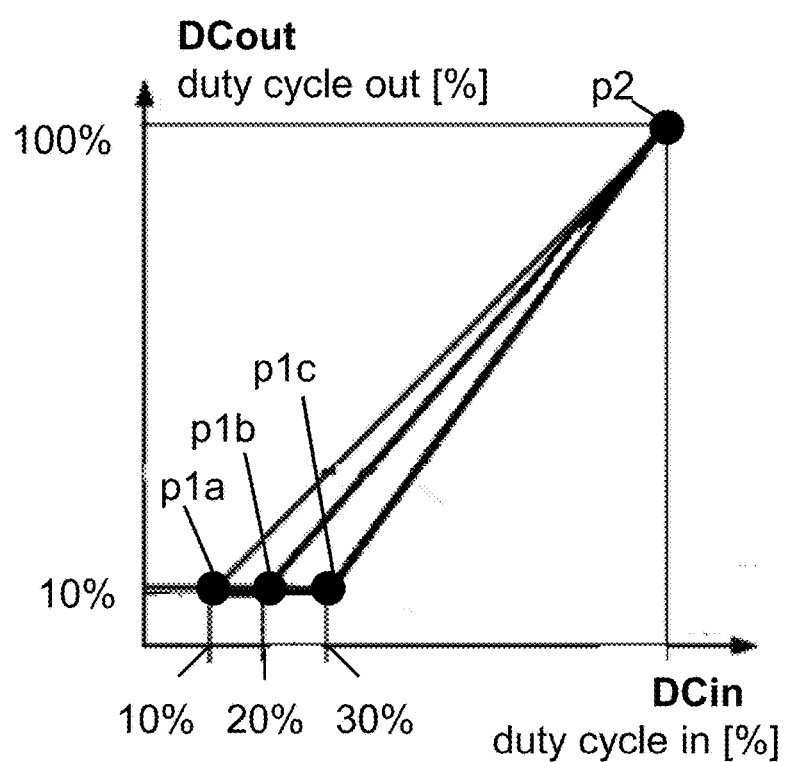
FIG. 3 shows a prior art single-coil motor driver circuit as can be used in the circuit of FIG. 2, implementing three linear transfer characteristics, one of which can be selected by means of passive components (e.g. resistors and/or capacitors).

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in this document reference is made to "phase" or "half period", reference is made to the time the rotor needs to turn over 180° electrical degrees.

Where in this document reference is made to "time" what is meant is the "relative time", and can be expressed herein as a percentage of a half period, or as an angle, or as a count value. For example, an angle of about 180°/32≈5.6°, and a fraction of 100%/32≈3.1% of the phase period, and (assuming the phase is divided in 32 clock ticks) a count value N=1, mean the same thing. The absolute time corresponding to this relative time is dependent on the actual motor speed.

FIG. 1(a) shows a typical torque of a single-coil motor, and FIG. 1(b) shows a typical torque of a three-phase motor, as a function of angular rotor position. From these curves it can be appreciated for example that an energizing pulse of a given amplitude and duration provided at time "A" has a larger impact than the same pulse provided at time "B". For the single-coil or two-coil motor, the impact is maximal at 90°, 270° etc, and minimal at 0°, 180°, etc. For the three-coil motor, the impact is maximal at 60°, 180°, 300° etc, and minimal at 0°, 120°, 240°, etc.

FIG. 2 shows a fan cooling system, as can be used for example in a laptop environment or in telecommunication applications, or for cooling head lights or for ventilating seats in automotive applications. How the system of FIG. 2 works, is already discussed in the background section.

FIG. 3 shows the behavior of a (low cost) prior art single-coil motor driver circuit 23 typically used in the circuit of FIG. 2, implementing three linear transfer characteristics for converting an incoming PWM signal into an outgoing PWM signal. One of these curves can for example be selected by means of passive components (e.g. resistors and/or capacitors) or by means of an internal fuse or the like. However, the driver circuit 23 shown is not suitable for automotive environment, inter alia because it requires additional components for EMC filtering which is too expensive, and because the circuit creates acoustic noise even for a fixed fan speed setting (hardwired or received from the CPU 21), when the battery voltage and/or temperature fluctuates.

It is noted that the main focus of the present invention is not the start-up behavior of the fan, but to a way of driving the fan motor once it is running (e.g. after a predetermined speed is reached). Like most motor drivers, the motor driver of the present invention also has at least two modes of operation:
- a start-up mode wherein a suitable start-up scheme is used to guarantee start-up of the single-coil motor to make the motor spin in the right direction, and
- a normal-operation mode where the motor is running at the desired speed.

Any manner of starting the single-coil motor known in the art can be used, but the focus of the present invention is on the normal operation mode.

Figure 4:
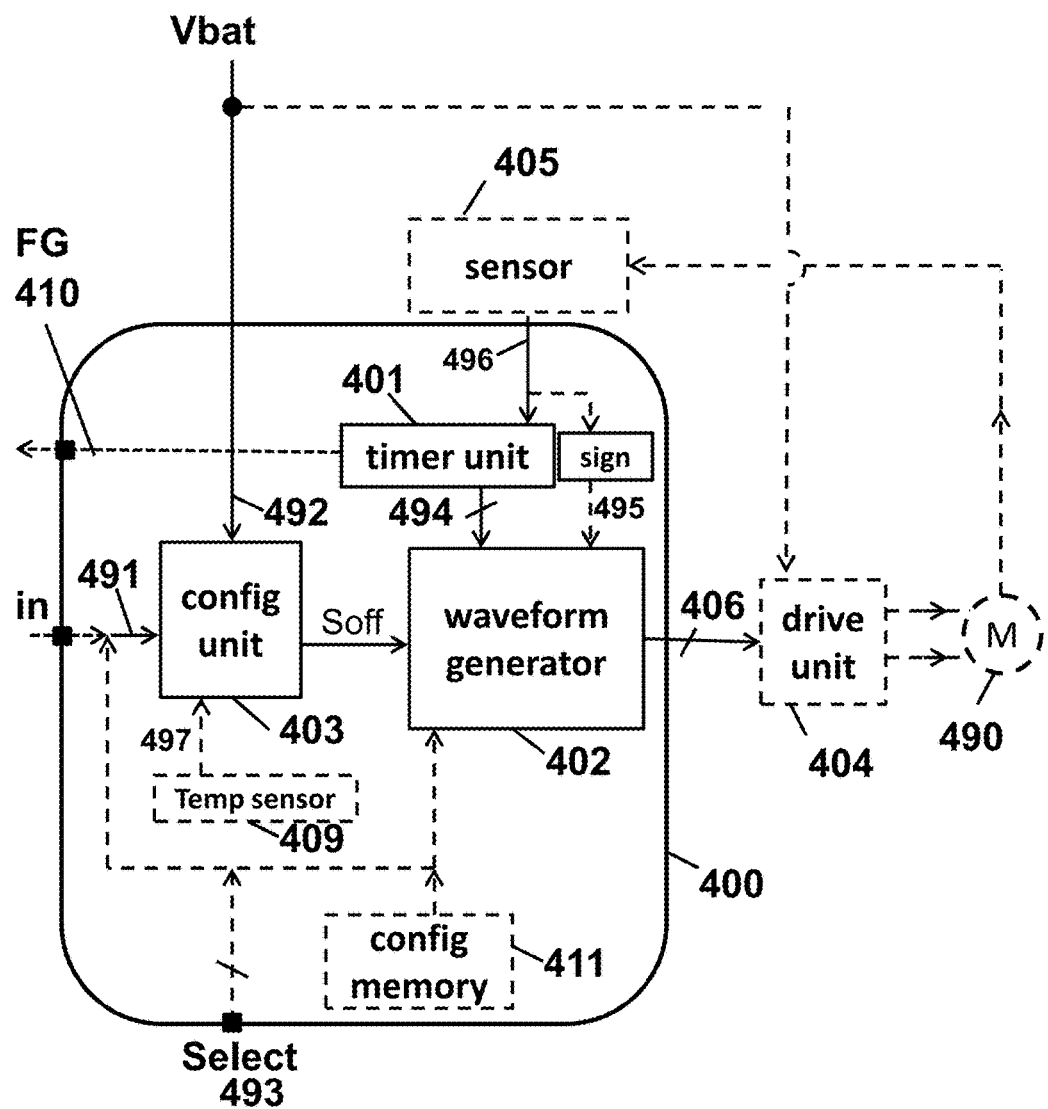
FIG. 4 shows a block-diagram of a first exemplary embodiment of a single-coil motor driver according to an embodiment of the present invention.

In order to modify the driver circuit 23 of FIG. 2 having the behavior of FIG. 3 such that it is better suited for automotive applications, the inventors came to the idea of providing a drive circuit 400, an example of which is shown in FIG. 4. The drive circuit 400 comprises:
- a timer unit 401 adapted for receiving a sensor signal 496 indicative of an angular position of a rotor of the single phase motor 490, and for providing at least one timing signal 494 in phase with the sensor signal 496;
- a waveform generator 402 for generating at least one waveform for energizing the single phase motor 490 the waveform generator being adapted for receiving the at least one timing signal 494 (in phase with the sensor signal and thus in phase with the rotor position), and for receiving at least one configurable setting and being adapted for generating the at least one waveform based on the at least one timing signal 494 and based on the at least one configurable setting, the at least one configurable setting comprising or consisting of at least one ON-time setting or OFF-time setting, for example one or more values selected from the group consisting of: Soff, Soff_begin, Soff_end, Soff_mid, SonX, SoffX, the meaning of which will be explained further, with reference to FIG. 6, but other parameters for describing similar waveforms, such as width of the "extra dip-pulse in FIG. 6(*d*) can be used as well;
- a configuration unit 403 adapted for receiving a first input signal 491 indicative of a desired speed of the single phase motor 490 and for receiving at least one of:
- a second input signal 492 indicative of an actual value of a supply voltage Vbat, and
- a third input signal 497 indicative of an actual temperature of the drive circuit, and being adapted for determining the at least one configurable setting (e.g. one or more of the parameters Soff, Soff_begin, Soff_end, Soff_mid, SonX, SoffX) based on the first input signal 491 and/or the second input signal 492 and/or the third input signal 497, and for providing the at least one configurable setting to the waveform generator 402 to dynamically configure the waveform generator as a function of the desired speed and/or the actual supply voltage Vbat and/or the actual temperature.

In FIG. 4 the voltage supply signal 492 is present and the temperature signal 497 is optional, but in a variant the supply voltage signal 492 is optional and the temperature signal 497 is present, or preferably both the supply voltage signal 492 and the temperature signal 497 are present.

The temperature sensor 409 is preferably embedded in the drive circuit 400, so that it has the same temperature as the rest of the circuit.

One of the main advantages of this driver circuit 400 is that allows controlling the speed of the fan in a manner less sensitive, e.g. substantially insensitive to variations of the supply voltage Vbat and/temperature.

Another main advantage of this driver circuit is that it does not require EMC filter components, because the waveforms generated for driving the switches present in the driver circuit 404 (optionally part of the drive circuit 400) are not PWM modulated with an independent modulation frequency (typically 16 kHz or 20 kHz), but are baseband signals, generated by the waveform generator in synchronism with the position signal 496, thus having a ground frequency corresponding to the angular speed of the motor, and some higher harmonics. The commutation frequency typically varies from about 50 Hz (at 1500 rpm) to about 500 Hz (at 15000 rpm). Modifying the OFF-time as a portion of the electrical revolution without PWM frequency, allows modifying the speed in a limited range without inducing acoustic noise (related to the PWM frequency), or vibration due to torque ripple which in turn may induce audible noise. Furthermore, by not using the relatively high PWM frequencies, EMC components can be omitted, which amount to a considerable portion of the system cost.

In the example shown in FIG. 4, the configuration unit 403 receives a first input signal 491, which can for example be a variable speed setting, for example as indicated by means of a PWM signal coming from an external processor 21 (for example like that shown in FIG. 2), but a digital signal or an unmodulated voltage signal could also be used.

Alternatively, the first input signal 491 may indicate a fixed speed setting, the speed being defined by "internal configuration means", such as for example by using a non-volatile programmable memory 411 (e.g. flash), or by blowing internal fuses (for example in an End-Of-Line configuration), or the speed being defined by "external configuration means", for example via one or more select pins 493 which may provide one or more digital values (e.g. by means of pull-up or pull-down resistor) or may provide one or more analog values (e.g. by means of a specific resistance value or capacitance value, or in any other way.

In each case, the first input signal 491 is indicative of a "desired speed" to be achieved by the motor. It is noted that this speed is referred to as "desired speed", because in an open-loop control system, this desired speed will usually only be approximated. Although it would be possible to further modify the driver circuit 400 in a closed-loop manner, it is not the main focus of the present invention, because it would make the driver more complex and thus more costly.

In the example shown, the configuration unit 403 also receives a second input signal 492, indicative of the supply voltage Vat. In the example shown the supply voltage itself is used as input signal, but in practice typically a signal with a reduced amplitude and optionally low-pass filtered, may also be used as the second input signal 492.

Although shown as optional input, the configuration unit 403 preferably also receives a third input signal 497, indicative of a temperature of the driver circuit 400, for example of the chip.

According to an important aspect of the present invention, the configuration unit 403 receives the first input signal 491, but also one or both of the signals 492 (supply voltage) and/or 497 (temperature), and uses them to determine, e.g. calculate one or more ON-values or OFF-values.

In the example shown in FIG. 4, a single offset-value "Soff" is determined, which is provided to the waveform generator 402, but that is not the only embodiment envisioned.

Figure 6:
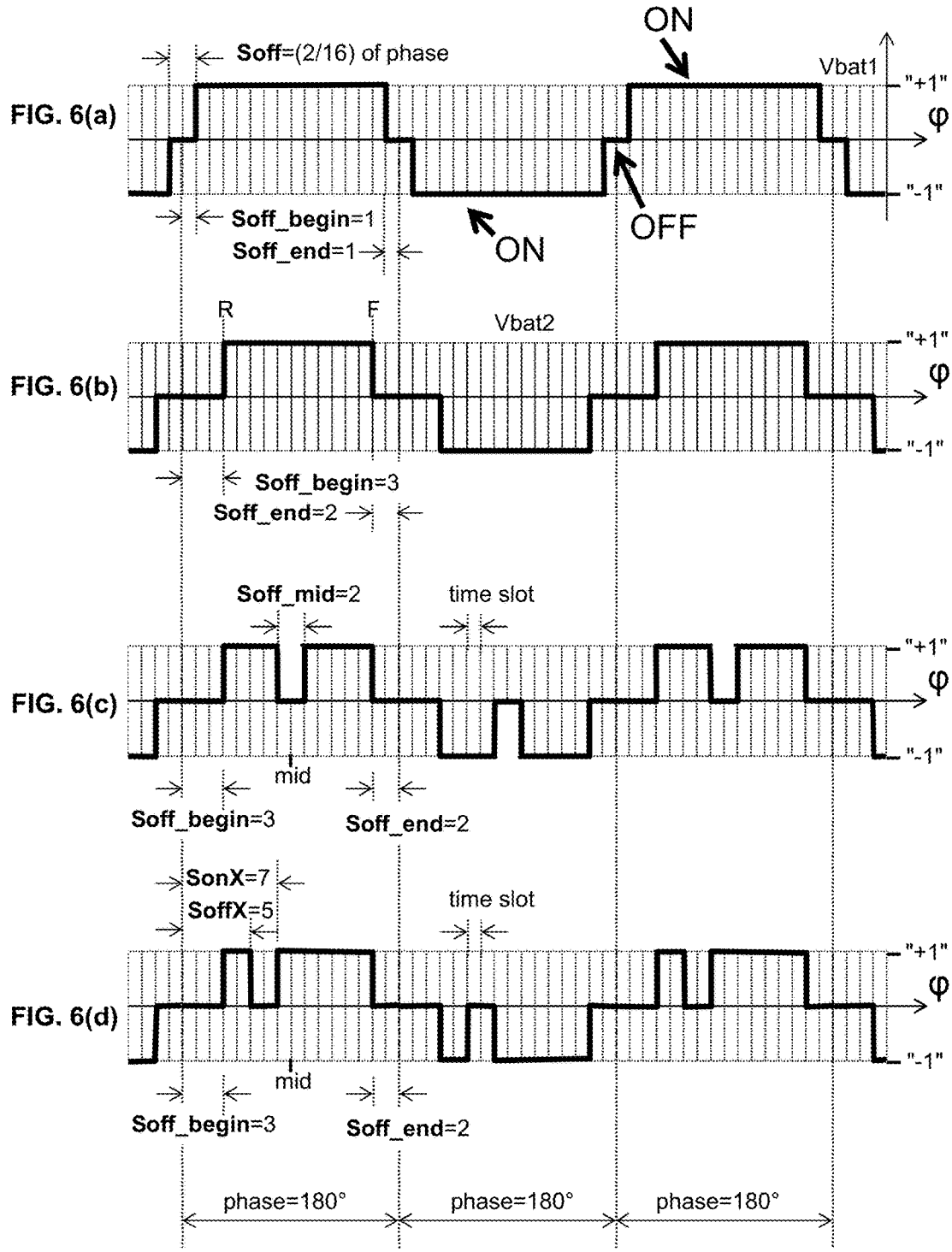
FIGS. 6($a$)-6($d$) illustrate four examples of possible waveforms, as can be used in embodiments of the present invention. The waveform of FIG. 6($a$) has an amplitude Vbat1 (e.g. 11V) of the supply voltage at a first moment in time. The waveform of FIG. 6($b$) has an amplitude of Vbat2 (e.g. 16V) of the supply voltage at a second moment in time. The waveform of FIG. 6($c$) has an extra symmetrical or asymmetrical dip located in the middle of the ON-period. The waveform of FIG. 6($d$) has an extra dip located anywhere in the ON-period.

FIG. 6 shows several examples, but the present invention is not limited to these examples, and other examples are also possible.

Example 1

In an embodiment (illustrated in FIG. 6a), the configuration unit 403 provides a single parameters Soff to the waveform unit, the parameters Soff representing an OFF-time, i.e. the amount of time (e.g. expressed as a percentage of the phase) around the moment of commutation (e.g. immediately before or partly before and partly after or immediately after the moment of commutation, which e.g. coincides with a zero-crossing of the signal 496), during which time the waveform is to be zero (i.e. no current flowing in the coil). In embodiments where Soff is implemented as a count value (N), preferably the waveform generator will make the waveform zero for about half this number before the moment of commutation, and half this number after the moment of commutation. In other words, the waveform generator may convert the single number Soff into two other numbers: Soff_begin and Soff_end, for example according to the formulas:

Soff_begin=Soff/2 and Soff_end=Soff/2 (if Soff is even)   [1]

Soff_begin=Soff/2 and Soff_end=Soff/2+1 (if Soff is odd)   [2]

But another solution would be:

Soff_begin=Soff/2 and Soff_end=Soff/2 (if Soff is even)   [3]

Soff_begin=Soff/2+1 and Soff_end=Soff/2 (if Soff is odd)   [4]

Example 2

In a slightly different embodiment (illustrated in FIG. 6b), the configuration unit 403 provides two parameters Soff_begin and Soff_end to the waveform unit 402 for defining the waveform to be generated, the parameters indicating the position of the rising edge "R" and the falling edge "F" of the pulse in each phase.

In a variant, a parameter "Son" could be provided, indicating the width of the pulse in each phase or the ON-time during each phase.

In the examples of FIG. 6(a) and FIG. 6(b) there is only one pulse per phase, and the position and the width can be configured by means of the configurable setting(s).

Example 3

In yet another embodiment (illustrated in FIG. 6c), the configuration unit 403 provides two parameters Soff and Soff_mid to the waveform unit 402, the value Soff having the same meaning as described above (and as illustrated in FIG. 6a), the value Soff_mid representing the time (or percentage of the phase) near the middle of the phase during which time the waveform is to be zero. The single value Soff_mid can be split by the waveform generator 402 in two separate values Soff_mid before and Soff_mid after in a manner similar to the split of Soff into the two values Soff_begin and Soff_end.

In a variant the configuration unit 403 provides three values Soff, Smid_before and Smid_after, but the waveform would look exactly or very much the same.

In another variant the configuration unit 403 provides four values Soff_begin, Soff_end, Smid_before and Smid_after, but the waveform would look exactly or very much the same.

In another variant the configuration unit 403 provides three values Soff_begin, Soff_end, Soff_mid, but the waveform would look exactly or very much the same.

In other words, the example of FIG. 6(a) shows a waveform with one ON-pulse substantially in the middle of the phase, and having one "dip" substantially in the middle of the ON-pulse. The net result is that the waveform has two positive pulses or two negative pulses per phase.

Example 4

The waveform of FIG. 6(d) can be seen as a variant of the waveform of FIG. 6(c), where the "dip" is shifted off-center. Also this waveform can be described in various manners using one or more ON- or OFF-time settings, for example Soff_begin (to indicate the start of the ON-period), Soff_end (to indicate the end of the ON-period), SoffX (to indicate the start of the "dip") and SonX (to indicate the end of the "dip"), but other parameters can also be used to describe this waveform.

But of course the present invention is not limited to these specific examples, and the skilled person having the benefit of the present invention can easily think of other ways to define the waveforms shown in FIG. 6(a) to FIG. 6(d).

Important for the present invention is that there is only one or only two positive pulses per phase, meaning that the signal is a baseband signal. That is important, because by using such a signal instead of a PWM-modulated signal, the number of EMC components (for example for implementing a so called "pi-filter") can be reduced, or can even be omitted.

Another important aspect is that by dynamically changing the waveform as a function of the first, second and/or third signal, the motor speed can be controlled. More specifically, in a manner that the resulting speed of the motor is less dependent on voltage variations and/or temperature variations. A possible algorithm for dynamically determining or calculating the one or more ON-time or OFF-time values as a function of the input signals, will be described further, with reference to FIG. 8 and FIG. 9, but first the other components of the drive circuit 400 are described.

Referring back to FIG. 4, the motor driver circuit 400 further comprises a sensor 405 for sensing an angular position of the motor 490 to be driven, which sensor 405 may be integrated in the same chip as the driver circuitry, or could be an external circuit (hence indicated in dotted line) providing the angular position signal via one or more pins. The sensor 405 may e.g. be an optical sensor or a magnetic sensor arranged for detecting a magnetic field originating or corresponding to the rotor position, or any other suitable sensor. The sensor 405 is preferably a contactless sensor. Such sensors are known in the art, and hence need not be further explained herein.

As described above, the waveform generator 402 is adapted for generating so called "normalized" waveforms like those shown in FIG. 6 (a) to FIG. 6(d) based on one or more ON- or OFF-time parameters, but also takes into account the one or more timing signals 494 provided by the timer unit 401, in phase with the rotor position to provide a baseband signal 406 that is applied to the drive unit 404. Depending on the implementation, more than one baseband signal may be provided to the drive unit, for example one for each of the transistors of the drive unit 404, but that is an implementation detail, which need not be further discussed herein.

In the example shown in FIG. 4 the waveform generator 402 may also receive a signal 495 from the sensor 405. What is meant is that the waveform generator 402 may get an indication of the position of the rotor, for example in the form of a "sign signal", but that is considered an implementation detail.

The timer unit 401 may provide one or multiple timing signals in phase with the sensor signal, for example, a first timing signal for indicating the start of the phase period and a second timing signal for indicating the middle of the phase period, or preferably is a digital counter value.

In case of a digital implementation the device 400 may further comprise an oscillator (not shown), e.g. an internal RC oscillator for generating an internal clock signal, which may be applied to the timer unit 401 in case the timer unit 401 comprises one or more digital counters.

The motor driver circuit 400 may further comprise a drive unit 404 for energizing the motor 490, (also sometimes referred to as "output stage" or "power stage"). The drive unit 404 may be integrated in the same chip, or could be an external unit, or could even comprise a plurality of individual components. The drive unit 404 may comprise for example a number of switches or power transistors configured as double H-bridge for energizing the single phase motor coil, in one or in the opposite direction.

According to an important aspect of the present invention, the drive unit 404 will not convert the waveform(s) received from the waveform generator 402 into PWM output signals at a clock frequency of 20 kHz for example, but will apply the waveforms as baseband signal to open or close switches of the drive unit, with no or only minor modifications (such as e.g. the formation of an inverse or complementary signal in case the waveform generated by the waveform generator only has a single polarity and the drive unit 404 receives a "sign signal" 495 from the sensor and is responsible for applying the waveform in the correct direction, as explained above).

Optionally the timer unit 401 may be further adapted for providing a feedback signal 410, known in the art as "FG" (which stands for Frequency Generator), indicative of the actual speed of the motor. This signal may be provided to the motor controller 21 shown in FIG. 2, which may, but need not use this signal in a closed loop system, but the CPU would typically not compensate for voltage variations or temperature variations, but could compensate for example for load variations.

Figure 5:
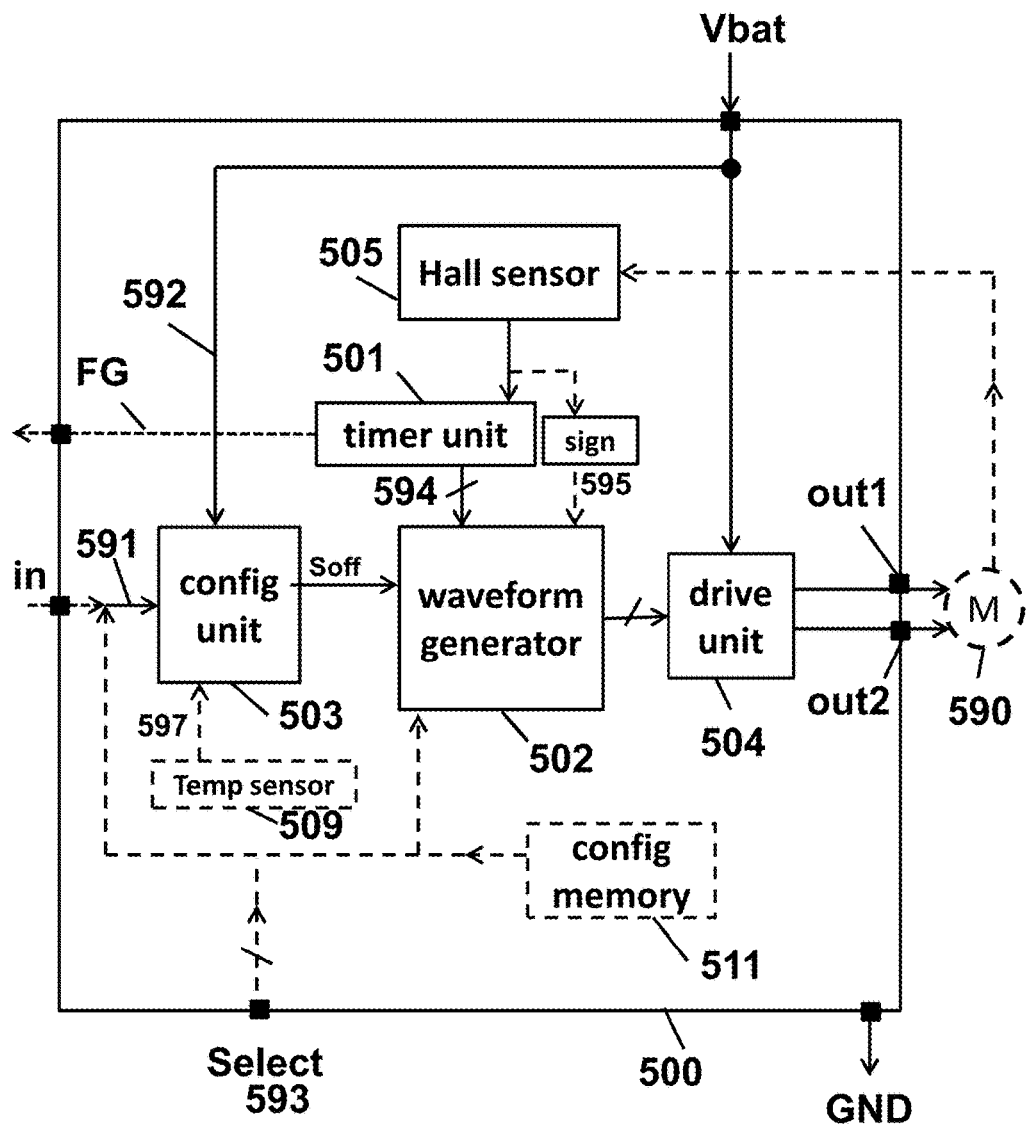
FIG. 5 shows a block-diagram of a second exemplary embodiment of a single-coil motor driver according to the present invention, embedded in a chip-package having only six pins (the select pins are optional).

FIG. 5 shows a variant of the single phase motor drive circuit of FIG. 4, integrated in a single chip. Everything mentioned for the embodiment of FIG. 4 is also applicable to the embodiment of FIG. 5, unless explicitly mentioned otherwise. The device 500 comprises a waveform generator 502 and a timer unit 501 and a configuration unit 503, which functions in exactly the same manner as described above.

In addition, the device 400 further comprises an embedded Hall sensor 505 and an embedded drive unit 404. It is an advantage that a single chip can be used to provide this functionality.

In a particularly embodiment the device 400 is implemented in a chip package having only eight pins, or having only six pins, represented by black squares. As described above, some of these squares are optional, for example the FG signal is purely optional.

In addition, at least one of the "in" pin and the select pins 593 are also optional. More specifically, in case the first input signal 591 is the signal entering at the "in" pin, the select pins 593 can be omitted. If the first input signal 591 is a signal coming from select pins or from internal fuses or from a configuration memory, the "in" pin can be omitted.

Which of these options is actually used can for example be decided at design time or as an End-Of-Line configuration during production.

FIG. 6 illustrates four "normalized" waveforms already discussed above, but of course the present invention is not limited to these examples, and other waveforms can be used as well.

In these examples the normalized waveform can have one of three values '−1' or '0' or '+1'. The value '0' means that the drive unit 404 will not energize the motor coil, the value '+1' means that the drive unit 404 will apply the supply voltage Vbat in a first direction to the motor coil, the value '−1' means that the drive unit 404 will apply the supply voltage Vbat in a second direction to the motor coil, opposite the first direction.

In the examples shown in FIG. 6, a digital implementation is assumed, based for example on counters and a local RC oscillator, and wherein the phase or 180° or "halve period" is divided in sixteen (16) equal parts, but the present invention is not limited to this specific implementation, and other implementations, for example digital implementations whereas phase is divided in less than sixteen or more than sixteen parts, or using an analog implementation (e.g. based on RC-delays) may also be used.

In order to fully appreciate the differences with prior art solutions where PWM signals are used, the reader should realize that the duration of the half period is about 333 ms for a motor running at 10 thousand RPM, and that one time slot (in case the half period is divided in 16 time slots) is about 21 ms. That is huge compared to time slots of typically 50 μs as is the case of PWM modulation. The slower signals cause much less EMC radiation, and it is contemplated that no pi-filter is required, but a simple decoupling capacitor is sufficient.

In FIG. 6 each phase was divided in 16 time slots in order not to overload the drawings, but in practice, it is preferable to divide the phase in 32 or 64 or even 128 time slots, but preferably not more than 256 time slots. The more time slots, the more accurate the motor can be controlled, and the more accurately the desired motor speed can be approximated.

Figure 7:
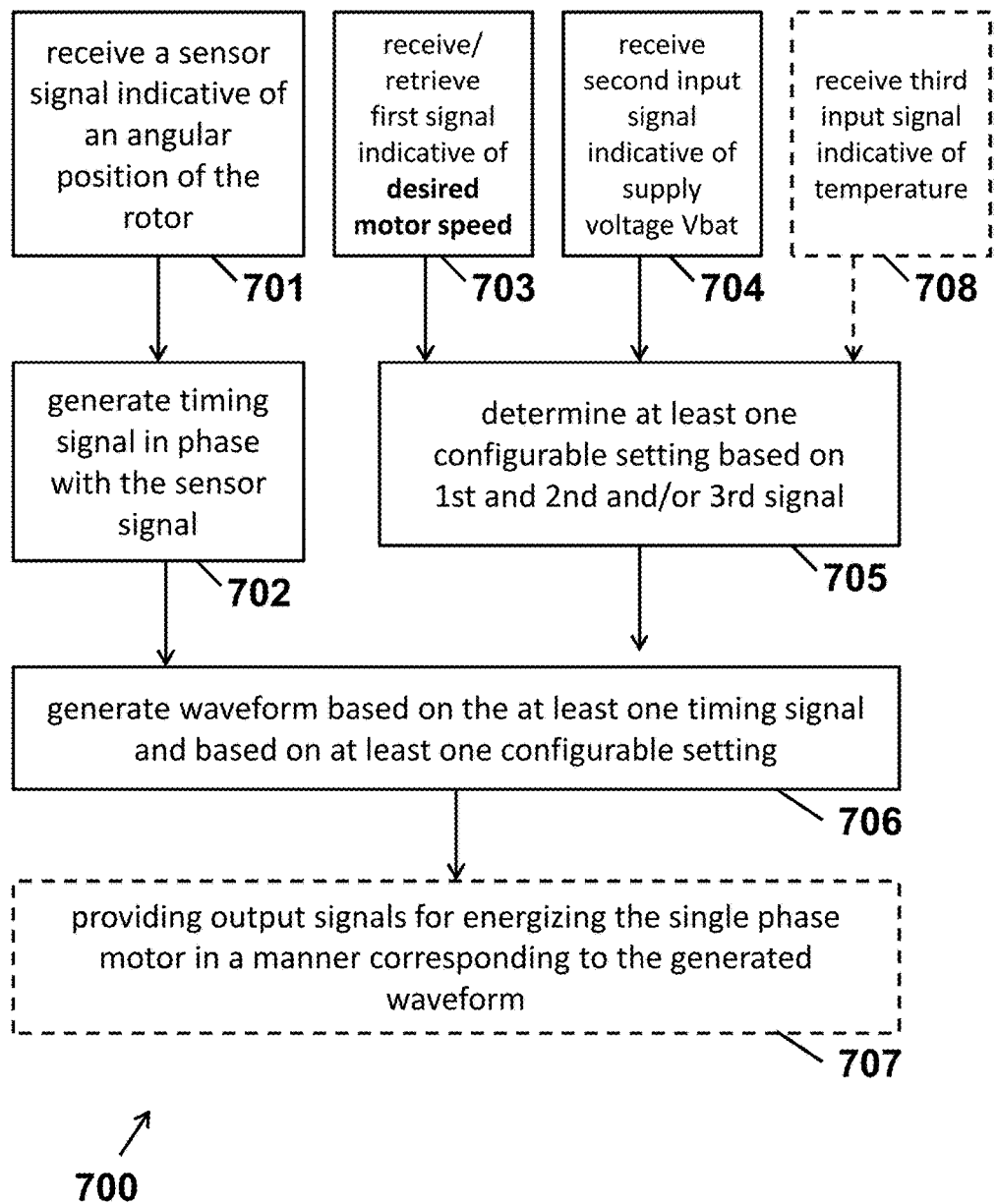
FIG. 7 illustrates a method of driving a single coil motor according to embodiments of the present invention.

FIG. 7 illustrates a method 700 of driving a single coil motor according to embodiments of the present invention. The method comprises the following steps:

in step 701 a sensor signal is received indicative of an angular position of the rotor;

in step 702 a timing signal is generated in phase with the sensor signal;

in step 703 a first input signal (or value) is received, indicative of a desired motor speed (e.g. a motor speed relative to a predefined value);

in step 704 a second input signal (or value) is received indicative of the supply voltage Vbat (e.g. a momentary or average value of the supply voltage averaged over a predefined time interval);

in step 708 a third input signal (or value) is optionally received, indicative of a temperature value;

in step 705 at least one configurable setting is determined (e.g. retrieved from memory or calculated) based on the first input signal and at least one of the second input signal and third input signal;

in step 706 a waveform is generated (e.g. in the waveform generator) based on the timing signal and based on the at least one configurable setting (e.g. Soff_begin and Soff_end);

in step 707 the single phase motor is energized in a manner corresponding to the generated waveform.

What remains to be explained is a possible algorithm that can be used to convert the first and second input signal into one or more off-time setting(s) such as Soff or Soff_begin and Soff_end or the like. This will be explained by way of a numerical example, shown in the tables of FIG. 8 and FIG. 9, but of course the present invention is not limited to only this specific example, and other values can also be used. The example is merely intended to illustrate one possible way of determining suitable ON- or OFF-values.

It is assumed in this example that the supply voltage Vbat can vary in the range from a given minimum supply voltage Vmin=11.0 V to a given maximum supply voltage Vmax=16.0 V, or stated more accurately: that the fan speed should be able to remain substantially constant over this speed if only the second input signal varies but the first input signal is substantially fixed.

The example shows how suitable values for Soff_begin and Soff_end may be calculated as a function of the first input signal (desired speed) and the second input signal (supply voltage).

It is assumed that the phase (180°) is divided in (Nsteps=) 32 time slots, thus each time slot corresponds to an angle of 180°/32=about 5.6° (=Tslot). It is assumed that the first input signal (relative speed) is expressed as a percentage of a maximum speed value, and that the supply voltage is a value in the range from (Vmin=) 11.0 to (Vmax=) 16.0 and that the value of Soff_begin and Soff_end are to be determined as count-values Noff_begin and Noff_end respectively, and that the maximum ON-time (i.e. the part of the phase where the waveform is non-zero) is 160°. These predefined or given values are indicated in gray boxed in the table, but of course other values may be chosen.

Based on these starting values, the calculation could go as follows:

$$\text{OFF\_time} = 180° - \text{ON time} \quad [5]$$

$$\text{OFF\_begin} = (\text{OFF\_time}/2) \quad [6]$$

$$\text{OFF\_end} = (\text{OFF time}/2) \quad [7]$$

$$\text{Noff} = \text{round}(\text{OFF time}/T\text{slot}) \quad [8]$$

$$\text{Noff\_begin} = \text{Noff}/2 \quad [9]$$

$$\text{Noff\_end} = \text{Noff} - \text{Noff\_begin} \quad [10]$$

In the example intermediate supply voltages are shown in the range from 11V to 16V in steps of 0.5V, in order not to overload the Figure, but in practice of course, a finer granularity can be chosen. For each supply voltage, the ON-time is calculated as:

$$\text{ON\_time} = \text{max\_ON} \times V\text{min}/V\text{bat} \quad [11]$$

The formula [11] clearly shows the influence of the second input signal "Vbat", for example in an inversely proportional relationship to the ON-time.

FIG. 8 shows a similar table, but for the case where the first input signal is not 100%, but 35% (in this example). The ON time would then be calculated as:

$$\text{ON\_time} = V\text{rel} \times \text{max\_ON} \times V\text{min}/V\text{bat} \quad [12]$$

The formula [12] shows the influence of the first input signal "Vrel" in a proportional relationship and the second input signal "Vbat" in an inversely proportional relationship to the ON-time.

The last three columns of FIG. 8 and FIG. 9 are mentioned as a kind of verification. It shows the influence of dividing the phase in 32 steps, resulting in a kind of quantization error. As can be seen, for Vrel=100% and Vbat=11V, the actual ON_time is not 160° but 157.5° which is a deviation of −1.6%. The last column of FIG. 8 shows an important advantage of embodiments of the present invention, namely that the energy supplied to the motor remains substantially constant, even when the supply voltage varies considerably (in the example from 11V to 16V). This results in less acoustic noise due to inadvertent acceleration and deceleration of the fan speed when the supply voltage varies.

Of course the values of Vmin=11V, Vmax=16V, max_ON=160°, Nsteps=32 are only examples, and be readily modified, depending on the application.

When comparing the last column of FIG. 9 with that of FIG. 8, it can be seen that the relative deviation of the fan speed is larger as the desired motor speed is smaller (in the example 35% instead of 100%), but the maximum deviation of about +/−6% is much smaller than the 45% variation that would occur if the supply variations are not taken into account. It will be appreciated that the error of +/− about 6% can be further decreased by dividing the phase in more than 32 time slots.

The values for Noff_begin and Noff_end can be calculated at design time (e.g. in a spread sheet) and then stored in a list in non-volatile memory, or being hardcoded, or can be calculated on-the-fly. There is plenty of time available, and the calculations are rather basic.

The exemplary numbers mentioned in FIG. 8 and FIG. 9 are based on the assumption that torque is constant during the entire phase. As can be seen in FIG. 1, this assumption is incorrect, because the torque halfway the phase (φ=90° for a two-phase motor; φ=60° for a three-phase motor) is much higher than the torque near the start and end of the phase (φ=0° or 180° for a two-phase motor; φ=0° or 120° for a three-phase motor). For the exemplary data of FIG. 8 and FIG. 9, this means that an increase of the value Noff_begin from for example "2" to "3" (assuming N=32) has only a minor influence on the torque, while an increase of the value Noff_begin from the value "10" to the value "11" has a much larger impact.

Looking back to the waveform of FIG. 6(c), it can now also be understood that increasing the value of Soff_mid from "0" to for example "2" has a much bigger impact than changing the value Soff_begin or Soff_end from "0" to "2". And when comparing the waveform of FIG. 6(d) with the waveform of FIG. 6(c), it can be understood that shifting "the dip" away from the middle, even when the width of the dip is kept constant ("2" in FIG. 6c and in FIG. 6d), means an increase of the total power provided to the motor during said phase.

Although not worked out in detail in this document, the skilled person can readily take the non-uniformity of the torque into account by appropriately adjusting the values of Noff_begin and Noff_end, e.g. by simulation or by trial and error, or in any other way.

Similar tables can be compiled for other parameter sets, as discussed above.

Final Considerations

The method described above is deemed slightly inferior in terms of noise/vibration as compared to a PWM controlled solution with soft switching. However, for a limited speed variation like +/−25%, but also for larger variations, for at least some applications the minor increase in noise/vibration is outweighed by the cost reduction related to the omission of EMC filter components.

For applications with fixed speed requirements, such as on/off fans, which have to operate in a wide temperature range, or in a wide supply range, such as in the automotive industry, a correction of +/−25% may be sufficient to meet end customer requirements or expectations. But the method of the present invention can also be used for example to cope with production tolerances, and it is contemplated that an end-of line calibration can be applied.

Although the data in the table of FIG. 8 and FIG. 9 only illustrated the influence of voltage on the motor speed (as a two-dimensional table), the data can be extended by also taking into account the influence of temperature variations, for example causing load variations of the bearing. Using the method and device of the present invention, such load variations due to temperature variations can automatically be taken into account, even in case of an open-loop controlled fan-driver.

Thus, embodiments of the present invention also provide a fan-driver capable of modifying the speed of the fan, without intervention of a remote processor. This can be in a closed loop way, similar to what the remote processor 21 of FIG. 2 would do. Alternatively, it can also be based on feedforward temperature and/or supply information. This information can be provided through external sensors, and input pins to the fan driver. But in a lowest cost implementation, the supply and/or temperature that is available inside the fan driver can be used, in order to minimize the package pin count, and thus minimize the fan driver cost, and thus minimize the overall fan cooling system cost. In such embodiments, the target speed or output power may be set by means of external resistors, or programmed in to non-volatile memory inside the fan driver.

It is contemplated that the rate at which the ON-times or OFF-times are adjusted should be sufficiently low to avoid entering the audible range. Increasing an OFF-parameter at 9000 rpm, implies an additional 300 Hz signal that is injected into the coil current. Fast transitions of current with the presence of the full BEMF causes torque ripples. In order to maximize the operating range with minimum vibrations, and without causing excessive dissipation, it is possible to apply linear FET driving to install soft switching to change between ON and OFF periods. The increase of the OFF-time around the electrical commutation point can be done in many ways, for instance extending the "dead zone" symmetrically around the commutation point, or asymmetrically, for instance by switching off sooner. This method influences the lead angle, which may be preferred.

The invention claimed is:

1. A single phase motor drive circuit for driving a single phase motor, the single phase motor drive circuit comprising:
a timer unit adapted for receiving a sensor signal indicative of an angular position of a rotor of the single phase motor, and for providing at least one timing signal in phase with the sensor signal;
a waveform generator for generating at least one waveform for energizing the single phase motor, the waveform generator being adapted for receiving the at least one timing signal and for receiving at least one configurable setting, and being adapted for generating the at least one waveform based on the at least one timing signal and based on the at least one configurable setting, the at least one configurable setting consisting of one or more ON-time settings corresponding to time when the waveform is to be non-zero or OFF-time settings corresponding to time when the waveform is to be zero (Noff, Noff_begin, Noff_end); a phase period comprising at most two ON-time settings;
a configuration unit adapted for receiving a first input signal indicative of a desired speed (Vrel) of the single phase motor and for receiving at least one of a second input signal indicative of a supply voltage (Vbat) and a third input signal indicative of a temperature of the single phase motor drive circuit (Temp), the configuration unit being adapted for providing the at least one configurable setting as a function of the first input signal (Vrel) and at least one of the second input signal (Vbat) and the third input signal (temp) to the waveform generator to dynamically configure the waveform generator as a function of the desired speed (Vrel) and at least one of the supply voltage (Vbat) and the temperature of the single phase motor drive circuit;
wherein the motor drive circuit is adapted for applying the waveform to the single phase motor as a baseband signal.

2. The single phase motor drive circuit according to claim 1, wherein the waveform generator is adapted for generating a waveform:
having a zero amplitude ('0') during a first portion of a phase (180°), the first portion having a first duration (ΔT1) defined by or derivable from the at least one configurable setting;
having a maximum amplitude ('1', '−1') during a second portion of the phase (180°), the second portion having a second duration (ΔT2) defined by or derivable from the at least one configurable setting;
having a zero amplitude ('0') during a third portion of a phase (180°) of the phase (180°), the third portion having a third duration (ΔT3) defined by or derivable from the at least one configurable setting.

3. The single phase motor drive circuit according to claim 2, wherein the waveform generator is further adapted for generating the waveform to optionally also have a zero amplitude ('0') during a fourth portion of the phase (180°), the fourth portion having a fourth duration (ΔT4) defined by or derivable from the at least one configurable setting, and falling within the second duration (ΔT2) of the phase.

4. The single phase motor drive circuit according to claim 1, wherein the configuration unit is either adapted for providing the at least one configurable setting as a function of the first input signal (Vrel) and at least one of the second input signal (Vbat) and the third input signal (temp) but independent of the actual speed (RPM) of the motor; or
wherein the configuration unit is adapted for providing the at least one configurable setting as a function of the first input signal (Vrel) and at least one of the second input signal (Vbat) and the third input signal (temp) and as a function of the actual speed (RPM) of the motor.

5. The single phase motor driver circuit according to claim 1, wherein the timer unit comprises at least one counter.

6. The single phase motor drive circuit according to claim 5, further comprising an oscillator for generating a clock signal to the timer unit.

7. The single phase motor drive circuit according to claim 1, further comprising a digitizer,
wherein the digitizer is adapted for digitizing the first input signal or a derivative thereof in order to obtain a first digital value (Vres) indicative of the desired speed; and
wherein the digitizer is adapted for digitizing the second input signal or a derivative thereof in order to obtain a second digital value (Vbat) indicative of the supply voltage and/or wherein the digitizer is adapted for digitizing the third input signal or a derivative thereof in order to obtain a third digital value (Temp) indicative of the temperature of the single phase motor drive circuit;

wherein the configuration unit is adapted for determining the at least one configurable setting as a function of the first digital value (Vres) and at least one of the second digital value (Vbat) and third digital value (Temp).

8. The single phase motor drive circuit according to claim 7, further comprising an arithmetic unit, wherein the configurable setting is calculated as a function of the first digital value and the second digital value.

9. The single phase motor driver circuit according to claim 1, wherein the sensor comprises a Hall element.

10. The single phase motor drive circuit according to claim 1, further comprising a drive unit adapted for receiving the at least one waveform from the waveform generator and for applying the supply voltage to the single phase motor in accordance with the waveform.

11. The single phase motor drive circuit according to claim 1,
  a) wherein the single phase motor drive circuit is embedded in a packaging having at most eight pins; or
  b) wherein the single phase motor drive circuit further comprises a Hall sensor and the drive unit, and being embedded in a packaging having only six pins.

12. An assembly comprising:
  a single phase motor driver according to claim 1;
  a fan comprising a single-coil motor, an output of the single phase motor driver being connected to an input of the motor for providing power.

13. A method driving a single phase motor, comprising the steps of:
  receiving a sensor signal indicative of an angular position of a rotor of the single phase motor;
  generating at least one timing signal in phase with the sensor signal, and providing said at least one timing signal to a waveform generator;
  receiving or retrieving a first input signal indicative of a desired speed of the single phase motor;
  receiving at least one of a second input signal indicative of a supply voltage (Vbat) and a third input signal indicative of the temperature of the single phase motor drive circuit (Temp);
  determining at least one configurable setting as a function of the first input signal and at least one of the second input signal and the third input signal (Temp), said at least one configurable setting consisting of one or more ON-time settings corresponding to time when the waveform is to be non-zero or OFF-time settings corresponding to time when the waveform is to be zero (Noff, Noff_begin, Noff_end), a phase period comprising at most two ON-time settings, and providing the at least one configurable setting to the waveform generator;
  generating at least one waveform based on the at least one timing signal and based on the at least one configurable setting.

* * * * *